Feb. 12, 1952 R. D. SLAYTON 2,585,282

ELECTRONIC MULTIPLEX TO START-STOP EXTENSOR

Filed June 24, 1950 4 Sheets-Sheet 1

INVENTOR
RANSOM D. SLAYTON
BY Emery Robinson
ATTORNEY

Feb. 12, 1952

R. D. SLAYTON 2,585,282

ELECTRONIC MULTIPLEX TO START-STOP EXTENSOR

Filed June 24, 1950

4 Sheets-Sheet 2

INVENTOR
RANSOM D. SLAYTON
BY Emery Robinson
ATTORNEY

Feb. 12, 1952 R. D. SLAYTON 2,585,282

ELECTRONIC MULTIPLEX TO START-STOP EXTENSOR

Filed June 24, 1950 4 Sheets-Sheet 3

INVENTOR
RANSOM D. SLAYTON
BY Emery Robinson
ATTORNEY

Feb. 12, 1952

R. D. SLAYTON 2,585,282

ELECTRONIC MULTIPLEX TO START-STOP EXTENSOR

Filed June 24, 1950

4 Sheets-Sheet 4

INVENTOR
RANSOM D. SLAYTON
BY Emery Robinson
ATTORNEY

Patented Feb. 12, 1952

2,585,282

UNITED STATES PATENT OFFICE 2,585,282

ELECTRONIC MULTIPLEX TO START-STOP EXTENSOR

Ransom D. Slayton, Lombard, Ill., assignor to Teletype Corporation, Chicago, Ill., a corporation of Delaware Application June 24, 1950, Serial No. 170,173

6 Claims. (Cl. 178—2)

Figure 1:
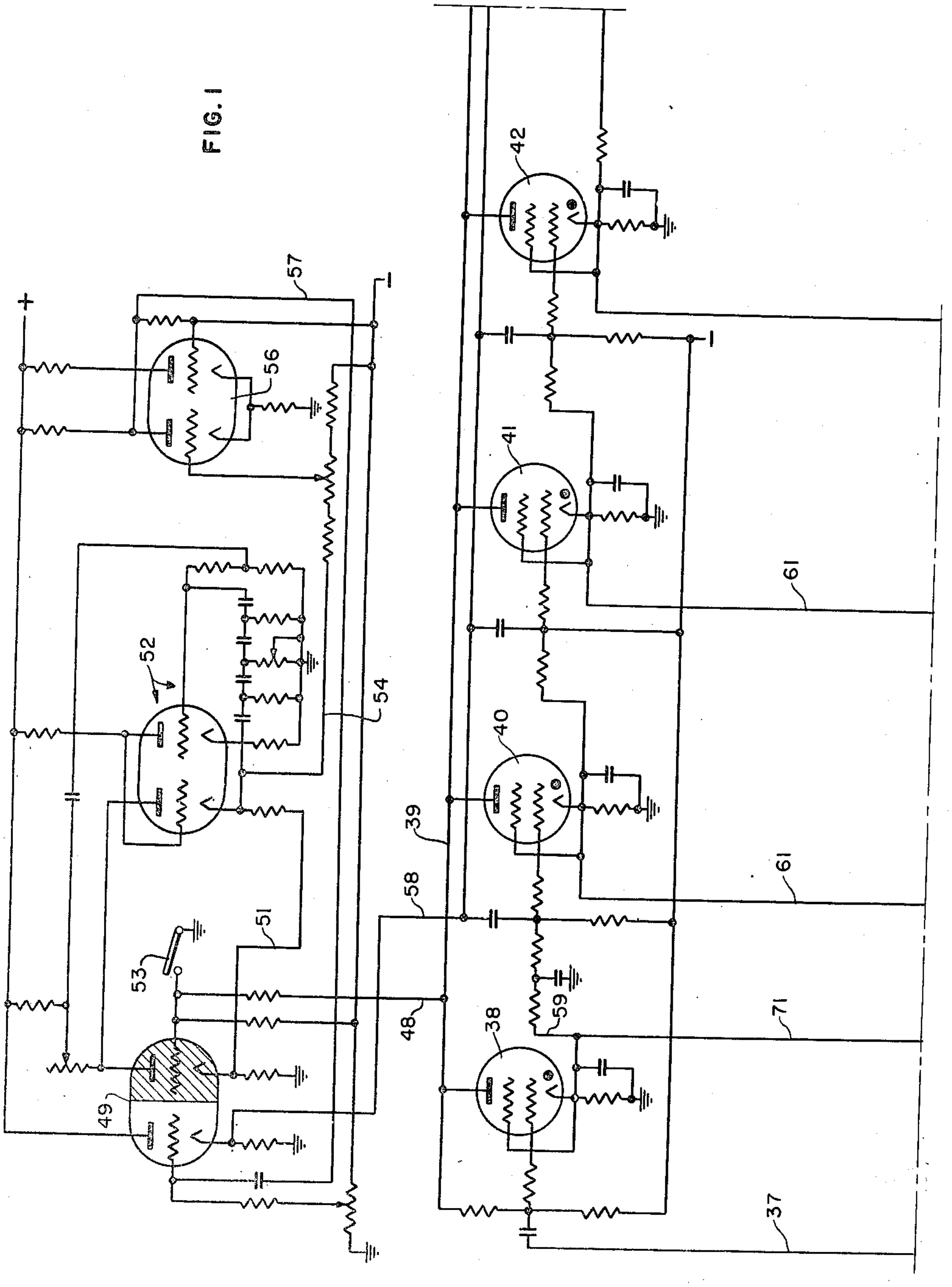

The present invention relates to telegraph converters and more particularly to an electronic converter for transposing multiplex to start-stop signals.

The use of converters for transposing a multiplex to start-stop code signal is not new in telegraph practice, it being done in many systems now in operation. The need for such conversion often occurs through the use of start-stop terminal equipment and multiplex linking channels wherein there are not sufficient individual start-stop circuits between the terminals and it is found desirable to use multiplexing facilities with each channel occupying only a portion of the usable circuit time. Also, the present trend of printing telegraph equipment is in the use of start-stop terminal equipment.

The prior known and utilized converters are mainly mechanical in nature and require a considerable amount of adjusting and regulating in order to operate efficiently. Further, in the use of mechanical apparatus there is constant wear and deterioration of parts, while mechanical characteristics place a limit to the speed of operation and accuracy of such devices.

Accordingly, an object of the present invention is to provide a multiplex to start-stop converter utilizing electronic devices as fully as possible.

Another object of the invention is to provide an electronic multiplex to start-stop converter which is low in initial cost and is free from the requirement of repeated adjusting.

Yet another object of the invention is to provide a converter which has few mechanical limitations.

A further object of the invention is to provide a converter having no elements operating during a period of failure of the associated multiplex circuit.

A further object of the invention is to provide an electronic converter utilizing a start-stop chain distributor controlled by a start-stop oscillator, which will not be released for operation except upon the receipt of a code signal.

Another object of the present invention is to provide a converter which under one setting will not be responsive to blank code signals but which under a second setting will receive and respond to the reception of blank code signals.

It might be mentioned that somewhat similar electronic converters are illustrated and described in my copending applications, Serial No. 54,776 filed on October 15, 1948, now Patent No. 2,536,578 issued on January 2, 1951, and Serial No. 170,172 filed on June 24, 1950. However, basic circuit techniques differ between the instant equipment and that disclosed in the pending application and patent.

The converter, in general, comprises a series of vacuum triodes which are responsive to permutation impulses from the multiplex receiving apparatus and which charge condensers in their output circuit. A series of matrix vacuum tubes are controlled from the initial circuits of tubes and condensers which store the signal impulses. A start-stop oscillator is released for operation through means operating in response to the reception of a code signal and the receipt of an operating impulse from the multiplex receiver to control a start-stop distributor of the gas tube chain type. The electronic distributor operates in conjunction with a series of vacuum mixer tubes, which are controlled by the matrix tubes, for impressing the multiplex signals to the start-stop line but with the addition of automatically inserted start and stop elements. Under a second condition provision is made for the release of the start-stop oscillator through the reception of a sixth element even though a blank code signal has been received, which under the above first condition would not release the oscillator for operation.

Figures 2, 5:
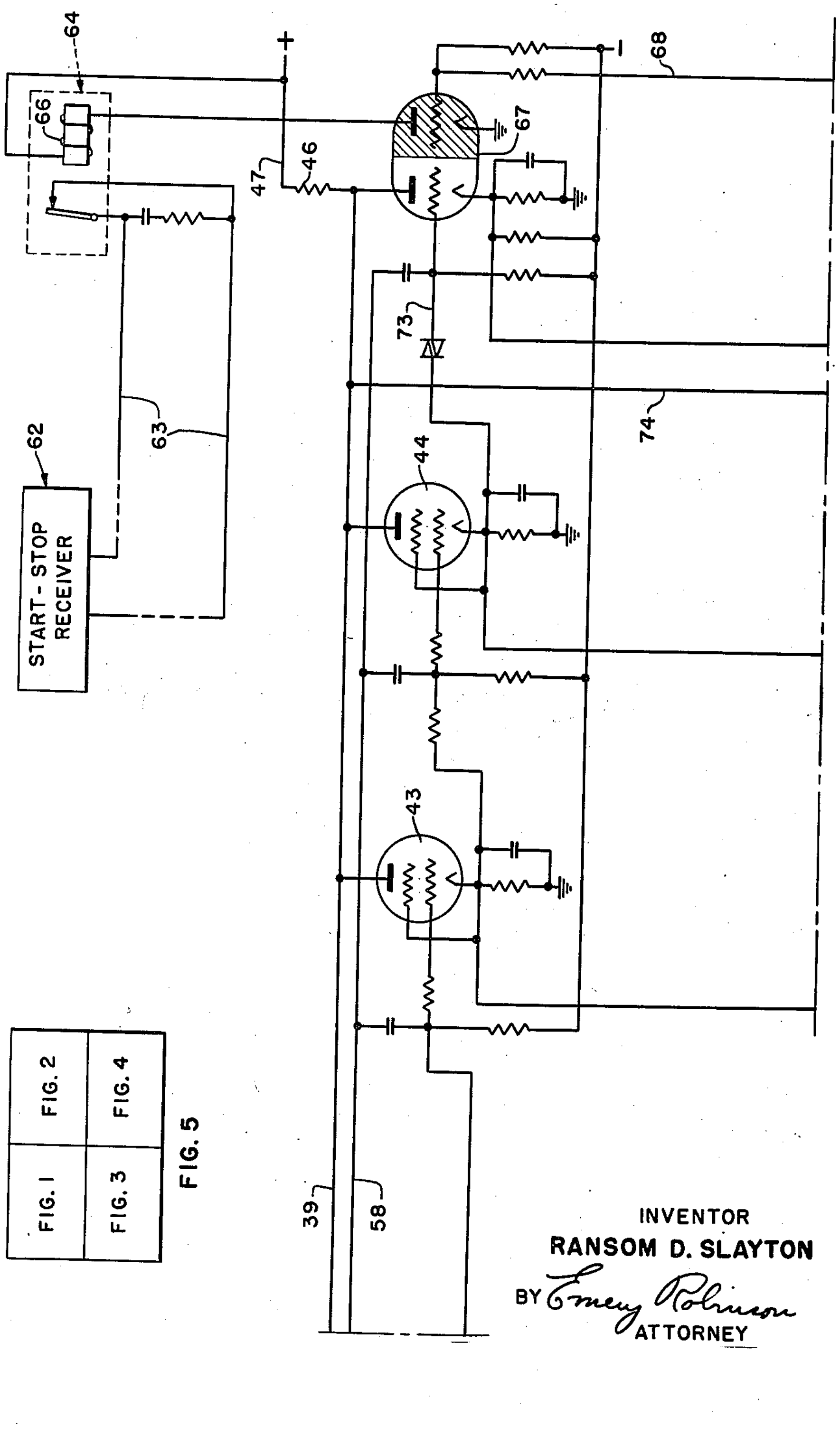

A more complete understanding of the invention may be had by reference to the following detailed description thereof when read in conjunction with the accompanying drawings, in which:

Figs. 1 to 4, inclusive, illustrate diagrammatically the components forming the present invention; and Fig. 5 illustrates in block diagram the correct positioning of Figs. 1 to 4, inclusive, to form an operative apparatus.

Figure 3:
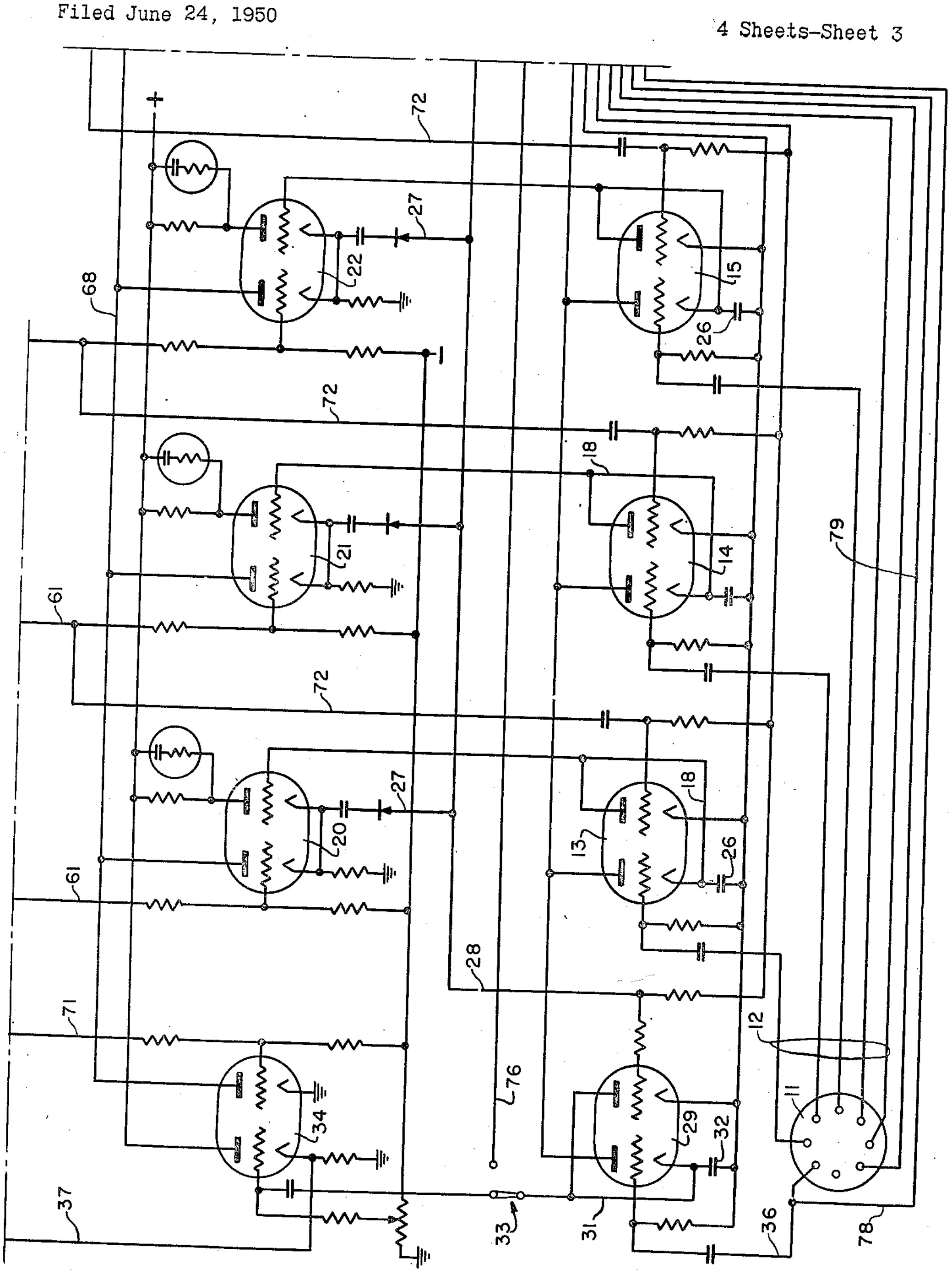
Figure 4:
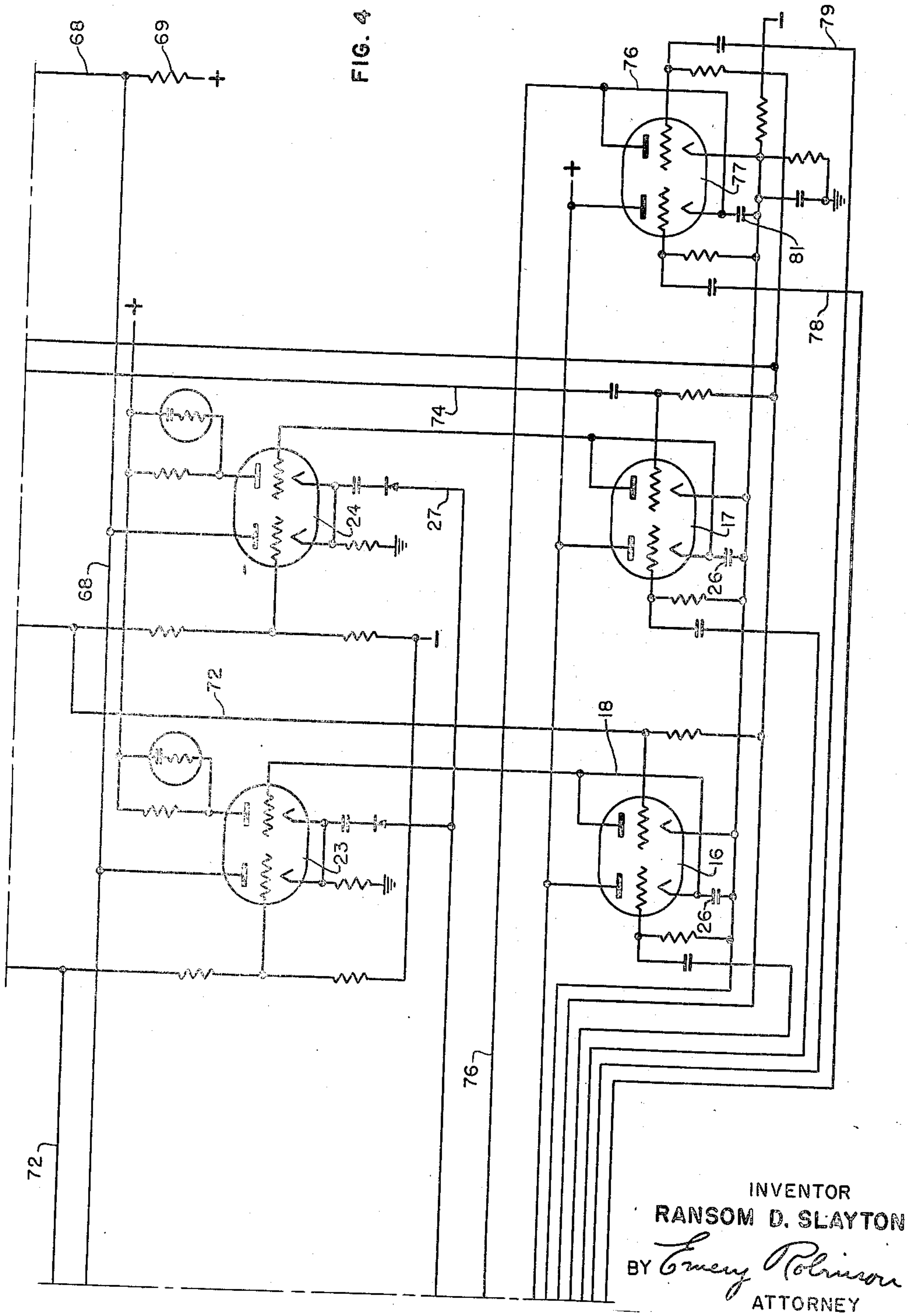

Referring to Fig. 3, a connector 11 is provided which is to be connected to an associated connector in the multiplex receiving distributor apparatus in conjunction with which the present apparatus is operating. Connected to the connector 11 are five conductors 12 which connect with the receiving distributor output for the instant channel, such conductors being connected in the well known mechanical multiplex system to the five receiving segments assigned to the code signal for the instant channel. The conductors 12 may also be connected to the conductors 1726 of the electronic receiving multiplex distributor disclosed in copending application Serial No. 54,772, filed on October 15, 1948, in the name of T. A. Hansen. If such latter connections are made the connector 11 will be connected with the connector 2003 in the cited application With such connections marking conditions will exist as positive potential impulses on the conductors 12 and spacing conditions as no potential conditions.

The conductors 12 are connected separately through individual condensers to the normally negatively biased grids of the normally nonconducting left-hand selector sections of a plurality of twin vacuum triode tubes 13 to 17, inclusive. Therefore, as the individual impulses are received by the receiving multiplex apparatus and relayed to the instant apparatus if a positive marking impulse is received on any conductor 12 it will cause the associated left-hand section of the tubes 13 to 17 to be rendered conducting, whereas if a zero potential spacing impulse is received on any conductor 12 it will allow the associated left-hand section of the tubes 13 to 17 to remain nonconducting.

The cathodes of the left-hand sections of the tubes 13 to 17 are each connected by branching conductors 18 to the normally negatively biased grids of the right-hand matrix section of twin triode vacuum tubes 20 to 24, inclusive.

The cathode circuits of the left-hand sections of the tubes 13 to 17, inclusive, are also each provided with a condenser 26 which is placed intermediate the connection to the branching conductor 18 and to a common conductor connected to negative battery.

In the event that the left-hand sections of any of the tubes 13 to 17, inclusive, are rendered conducting positive anode potential will pass to its cathode circuit, charging the condenser 26 therein. Such positive potential overcomes the normal negative bias on the cathode which is due to leakage through condenser 26 from negative battery. The left-hand sections of tubes 13 to 17 are connected as cathode followers, and have low impedance when conducting, so that a condenser 26 will be almost instantly charged to the peak of the potential impulse applied to the grid of the tube.

Similarly, the positive potential on the cathode circuit due to the charging of the condenser 26 will be impressed over the associated conductor 18 to cause the associated right-hand section of the tubes 20 to 24, inclusive, to be rendered conducting. Once such right-hand section of the tubes 20 to 24 is rendered conducting it will remain in that state, regardless of the state of its associated left-hand section of the tubes 13 to 17, because of the action of the associated condenser 26 in discharging only at a very slow rate toward the potential of the aforementioned negative battery.

Each of the right-hand sections of the tubes 20 to 24 is provided with a signal lamp in parallel with its anode load, so upon the associated tube becoming conducting the lamp will be illuminated to indicate the reception of a marking code element.

It may also be noted that the conductors 18 are also connected to the anodes of the right-hand sections of the tubes 13 to 17, inclusive. This is for a purpose to be described hereinafter. However, it might be mentioned that at this time the conduction of the left-hand section of any of the tubes 13 to 17 and the impression of positive potential on the conductors 18 will have no effect on the right-hand sections of the tubes 13 to 17 as no positive bias for rendering the right-hand sections of the tubes conducting is present at their grids at this time.

To repeat briefly the operations thus far described, positive marking or zero spacing impulses are received from the multiplex receiver over the conductors 12 to the grids of the left-hand selector sections of the tubes 13 to 17, inclusive. A marking impulse will result in that left-hand section of the tube being rendered conducting, whereas a spacing impulse will have no effect on the conduction of the tube. The effect on the left-hand section of the tube will be reflected in the associated condenser 26, a marking impulse resulting in the storing of positive potential charge and a spacing impulse allowing it to remain charged negatively.

Similarly, the right-hand matrix sections of the tubes 20 to 24, inclusive, will also be effected, becoming conducting on a marking impulse and remaining nonconducting for a spacing impulse. Thus, the signal condition of five impulses will be stored in the condensers 26 and in the right-hand sections of the tubes 20 to 24, inclusive.

The cathodes of the right-hand sections of the tubes 20 to 24, inclusive, are connected through condensers and crystal diode rectifiers by individual conductors 27 to a common conductor 28, and then through a resistor to the normally slightly negatively biased grid of a normally nonconducting right-hand section of a twin vacuum triode 29. Therefore, upon the right-hand section of any of the tubes 20 to 24 becoming conducting a positive impulse will result on its conductor 27 and on the conductor 28, causing the right-hand section of the tube 29 to be momentarily rendered conducting.

The anode of the right-hand section of the tube 29 is connected to a conductor 31 which terminates at one extremity in the cathode circuit of the left-hand section of the tube 29, the cathode then being connected through a condenser 32 to negative battery. The condenser 32 will have been positively charged prior to this time as the result of the receipt of a multiplex operating impulse, which operation will be described in detail later. Thus, when the positive impulse is impressed on the right-hand grid of the tube 29 from the conductor 28, the condenser 32 will discharge over the conductor 31 to the anode of the right-hand section of the tube, and through the tube, causing it to conduct. The cathode of the left-hand section of the tube 29 and the condenser 32 quickly attain a negative potential, such conduction lasting only until the condenser 32 discharges its positive charge.

The conductor 31 is also connected through a manually operable switch 33 and through a condenser to the normally negatively biased grid of the normally nonconducting left-hand section of a twin triode tube 34. The discharge of the condenser 32 through the right-hand section of the tube 29 will result in a negative impulse being impressed through the switch 33 to the grid of the left-hand section of the tube 34, but this will have no effect as the grid is already negatively biased and that section of the tube is not conducting at this time.

After the complete code signal of five impulses has been received and stored, a positive multiplex operating pulse will be directed to the instant apparatus through the connector 11 to a conductor 36. Such multiplex operating pulse may originate from a local segment if a segmented mechanical distributor is utilized, which is well known in existing telegraph practice. However, if the system disclosed in the mentioned T. A. Hansen application is utilized in conjunction with the present converter, with the connector 11 connected to the connector 2003, the conductor 36 will be connected to the conductor 2006.

The positive operating pulse will be impressed over the conductor 36 and through a suitable condenser to the grid of the left-hand section of the tube 29. This will result in such section being rendered conducting.

Upon the left-hand section of the tube 29 being rendered conducting positive potential will be impressed to its cathode circuit to charge the condenser 32. Such positive potential will also be impressed over the conductor 31, but at this time will not be dissipated through the right-hand section of the tube 29 as that section previously conducted only momentarily. Instead, the potential will be impressed through the switch 33 to the grid of the left-hand start pulse amplifier section of the tube 34. The left-hand section of the tube 34 will be rendered conducting, but momentary only, as the condenser in the conductor 31 passes only a single positive pulse.

During the interval of conduction of the left-hand portion of the tube 34, a positive potential impulse will be impressed from its output cathode circuit over a conductor 37 and through a suitable condenser and resistor to the moderately negatively biased control grid of a normally non-conducting gas filled start tube 38, causing the latter to be rendered conducting. The conduction will be more than momentary, as will appear, as the tube is of the gas variety. The anode of the tube 38 is connected by a common conductor 39 to the anodes of five gas filled distributor tubes 40 to 44, inclusive, and through a common anode resistor 46 and over a conductor 47 to a source of positive potential. If it is desired to obtain a complete description of the theory and operation of tube circuits including common anode resistors the same may be had by reference to U. S. Patent 2,412,642, issued to J. R. Wilkerson on December 17, 1946. However, the drop in potential of conductor 39, through the tube 38 conducting, will cause more negative bias to be applied to the control grid of the tube 38, preventing the tube from being again rendered conducting until the potential of the conductor 39 again rises; however, the tube 38 is not extinguished at this time.

Prior to the time that the start tube 38 was rendered conducting, positive potential had been supplied over the conductor 47, through the common anode resistor 46, over the conductor 39, and over a conductor 48 branching therefrom to the normally negatively biased grid of the right-hand oscillator control section of a twin vacuum triode tube 49. Under this condition, with positive bias on the grid of the tube 49, the right-hand section thereof is rendered conducting and continues in that state until the tube 38 is rendered conducting; the potential drop through common anode resistor 46 then removing the positive bias from the grid. At the time that the right-hand section of the tube 49 is conducting positive blocking potential is impressed from its output cathode circuit over a conductor 51 to the cathode of the left-hand section of a start-stop oscillator indicated generally by the numeral 52. No detailed description of the start-stop oscillator nor its operation will be given at this time as the same may be had by reference to U. S. Patent No. 2,373,737, issued on April 17, 1945, to M. Artzt, wherein a complete description may be found. Also, the right-hand section of the tube 49 has its anode connected to the anode of the left-hand section of the tube in the oscillator 52 and, therefore, when the tube 49 conducts its low anode potential reduces the gain of the tube of the oscillator 52 which will thus be doubly blocked and prevented from oscillating.

It might be noted at this time that a normally open manually operable switch 53 is connected to ground and associated with the grid of the right-hand section of the tube 49. If the switch 53 were to be closed, placing the grid at ground potential, the right-hand portion of the tube 49 will be rendered nonconducting and the start-stop oscillator 52 will be released for operation. The distributor, however, would not operate unless a start impulse was received from control tube 29. This allowance for free running of the oscillator 52 is provided so that the oscillator may be calibrated and adjusted to its desired frequency output. Such a frequency measurement may be made by applying the continuous signal to the input terminals of a cathode-ray oscilloscope along with the signals from a source of known frequency. A variable resistor in the oscillator circuit allows frequency adjustment.

Referring again to the fact that the tube 38 was rendered conducting and the right-hand section of the tube 49 was rendered nonconducting, no further potential will be impressed on the conductor 51 to block operation of the start-stop oscillator 52. The oscillator 52 will, therefore, commence to operate with its sine wave output being directed over a conductor 54 and through a variable resistor to the normally negatively biased grid of the left-hand section of a twin triode squaring amplifier vacuum tube 56. The two sections of the tube 56 will operate in a manner well known in the art to direct a square wave over a conductor 57 and through a suitable condenser to the normally negatively biased grid of the left-hand amplifier section of the tube 49. The condenser modifies the transition points of the square wave to sharp positive and negative impulses, with the left-hand portion of the tube 49 conducting in response only to the positive pulses. The left-hand portion of the tube 49 will thus amplify a succession of positive impulses which occur in accordance with the transition points of the sine wave output of the oscillator, and which will be impressed over a common conductor 58 to the control grid circuits of the distributor tubes 40 to 44, inclusive.

During the interval that the start tube 38 is conducting, positive potential is impressed from its output cathode circuit and through suitable resistors forming a portion of a delay network over a conductor 59 to the normally well negatively biased control grid of the distributor tube 40. The tube 40 will not be rendered conducting at this time, however, as this potential on its control grid is not sufficient to raise the grid to a value allowing conduction. However, this potential will exist during the interval that the tube 38 conducts and may be considered as a conditioning potential. The conditioning potential does not appear instantaneously at the grid of the tube 40, but is delayed by the necessity of charging a condenser through the first resistor in the network.

As it was mentioned previously that the start-stop oscillator 52 is released for operation upon the rendering conductive of the tube 38, upon the first positive impulse being impressed upon the conductor 58 from the squaring tube 56 and the left-hand amplifier section of the tube 49, an operating potential will be impressed through suitable condensers and resistors to the control grids of all of the tubes 40 to 44, inclusive. However, at this time the tube 40 will be the only distributor tube receiving a conditioning potential on its control grid and therefore will be the only tube of the group which will be rendered conducting. As the tube 40 is rendered conducting it extinguishes the tube 38 by means of the common anode resistor 46. If this first impulse were to be applied immediately after the rendering conducting of tube 38, the delay network attached to conductor 59 would have prevented tube 40 from being conditioned. Thus one full cycle of potential must be produced by oscillator 52 before tube 40 can be rendered conducting, during which period tube 38 remains conducting.

The tubes 41 to 44, inclusive, are interconnected with their preceding tube in a manner similar to that in which the tube 40 is connected to the tube 38 so that at such time as any of the tubes 40 to 43, inclusive, are conducting, they supply conditioning potential to the control grid of their associated succeeding tubes 41 to 44 inclusive. With conditioning potential being applied to the grid of one of these tubes that particular tube will be rendered conducting upon the receipt of the next distributor drive impulse on the conductor 58. The tubes 40 to 44, inclusive, will operate successively as described and thus form an electronic chain distributor.

It was mentioned previously that each of the right-hand sections of the tubes 20 to 24, inclusive, was in a conducting or nonconducting state in accordance with the particular multiplex code signalling impulses received on the conductors 12, a tube being rendered conducting by a marking impulse and nonconducting by a spacing impulse. If it be assumed that a marking condition is stored in the right-hand section of the tube 20 it will be conducting, and positive potential will be impressed from its output cathode circuit to the cathode of the left-hand mixer section of the same tube. If, conversely, it be assumed that a spacing condition is registered at the right-hand section of the tube 20, such tube will not be conducting and no positive potential will be impressed to the cathode of the left-hand section of the tube, such cathode then being at ground potential.

During the interval of conduction of the tube 40 positive potential will not only be impressed from its output cathode circuit to the control grid of its succeeding tube 41, but also will be impressed over a conductor 61 and through an appropriate resistor to the normally negatively biased grid of the left-hand mixer section of the tube 20. Thus, such section will conduct or not conduct depending on its cathode bias.

By reference now to Fig. 2 it may be seen that a start-stop receiving device or recorder indicated generally by a numeral 62, which may be located either locally or at a distant point, is connected over conductors 63 to the contacts associated with a mechanical line relay indicated generally by the numeral 64. An operating winding 66 of the line relay 64 is connected to battery at one side and on the other side to the anode of the normally conducting right-hand output mixer section of a twin vacuum triode tube 67. The relay 64 is so biased that during the normal conducting condition of the right-hand section of the tube 67 a marking or current carrying condition will exist on the conductors 63, the battery being supplied at the receiver 62. The normal condition of battery or marking on the line is well known, and is utilized in start-stop telegraphy in order that a recording device may be held in an unoperative condition during intervals when no signals are being transmitted over the line or signalling channel. This is the same as a stop impulse or condition.

The grid of the right-hand section of the tube 67 is connected through a resistor to negative battery, and also by means of a conductor 68 to the anodes of the left-hand mixer sections of the tubes 20 to 24, inclusive, to the right-hand start mixer section of the tube 34, and through a common anode resistor 69 to positive battery. During the interval that the right-hand section of the tube 34 and the left-hand sections of the tubes 20 to 24, inclusive, are not conducting, positive potential will be applied from the source of positive battery through the common anode resistor 69 and over the conductor 68 to supply positive bias to the grid of the right-hand section of the tube 67. This is the normal idle condition for the various mentioned tubes and allows the relay 64 to be positioned, through the conduction of the right-hand section of the tube 67 to supply idle marking battery, to the line conductors 63.

It is to be remembered that it was mentioned previously that with a signal stored in one or more of the right-hand selector sections of the tubes 20 to 24, inclusive, that upon receipt of the multiplex operating pulse over the conductor 36 the left-hand section of the tube 34 and the tube 38 would be rendered conducting. During the interval of conduction of the tube 38, which is equal to the telegraph code start impulse interval, potential will be impressed from its output cathode circuit over a conductor 71 to the normally negatively biased grid of the right-hand section of the tube 34. The right-hand section of the tube 34 will be rendered conducting during this interval, which through the connection to the common anode resistor 69 will result in a drop in potential on the conductor 68 with a resulting rendering nonconducting of the right-hand section of the tube 67. At this time the relay 64, through the cessation of current in its operating winding 66 will be biased or positioned to its opposite condition, resulting in a no current or spacing condition on the conductors 63, which is indicative of a start condition or impulse in start-stop telegraphy.

It has also been described how after an appropriate interval the tube 40 will be rendered conducting with the extinguishment of the tube 38, and the impression of potential to the grid of the left-hand section of the tube 20 over the conductor 61. Further, the left-hand section of the tube 20 will be rendered conducting for the No. 1 impulse interval, if a spacing condition exists in the right-hand section of the tube 20. If the left-hand section of the tube 20 is thus conducting, a potential drop will occur on the conductor 68 through the connection to the common anode resistor 69, which will cause a condition in the right-hand section of the tube 67 and the relay 64 similar to the start impulse condition described above. Under this condition a no current or spacing condition will exist on the conductors 63.

If, instead, a marking condition exists in the No. 1 impulse right-hand selector section of the tube 20 at the time that the tube 40 is conducting and impressing potential over the conductor 61 to the grid of the left-hand section of the tube 20, such section will be blocked from conduction because of the positive potential impressed to its cathode. Under this condition a potential rise will occur from the positive source of battery and through the common anode resistor 69 to the conductor 68, thereby allowing the right-hand section of the tube 67 to conduct. Upon this occurrence the relay 64 will be positioned so as to apply battery or a marking condition to the conductors 63, similar to the normal line condition described previously.

The tube 40 will remain conducting for an interval equal to the normal length of a signal impulse and thereafter upon the receipt of the next pulse from the oscillator 52 and subsequent circuits to the conductor 58 the tube 41 will be rendered conducting with the tube 40 becoming extinguished, all as described above. In the event that the left-hand section of the tube 20 had been conducting, signifying a spacing condition, it will be rendered nonconducting at the time that the tube 40 is extinguished.

Upon the tube 41 being rendered conducting its output cathode potential will be impressed to the grid of the left-hand section of the tube 21 in a manner similar to that described above. The left-hand section of the tube 21 will respond or will not respond in accordance with the code element stored in the right-hand section of the tube, in a manner also similar to that described with respect to the tube 20.

The tube 41 will remain conducting for an interval equal to a signal impulse and thereafter the tubes 42 to 44, inclusive, will each conduct for predetermined intervals in chain fashion as described. During the intervals of conduction of the tubes 42 to 44 the left-hand mixer sections of the tubes 22 to 24 will be rendered conducting or nonconducting in accordance with the signal condition stored in the right-hand sections of the tubes 22 to 24. Also, during the interval of conduction of the tubes 41 to 44 and in accordance with whether the left-hand sections of the tubes 21 to 24 are rendered conducting or not conducting similar conditions as described previously will be reflected on the conductor 68 to control the right-hand section of the tube 67 and the output relay 64 in accordance with prior descriptions.

At such time as the tube 41 becomes conducting potential is applied to its cathode circuit and to its associated conductor 61, as described previously. The positive potential on the conductor 61 will also be impressed over a branching conductor 72 and through a condenser to the grid of the right-hand section of the tube 13, causing this tube section to be rendered conducting. At this time the condenser 26 will be able to discharge over the conductor 18, over the branching conductor to the anode of the right-hand section of the tube 13 and through the tube. Actually, it is the potential stored in the condenser which supports conduction of the tube. With the condenser 26 discharged the cathode of the left-hand section of the tube 13 and the condenser 26 will be negative and the tube will be in readiness for the next signal impulse received.

The distributor tubes 42 to 44 will operate similarly to cause the cathode condensers 26 of the left-hand sections of the tubes 14 to 16 to be discharged if in a charged condition. In any event the succeeding distributor tubes 41 to 44 cause the preceding left-hand section of the tubes 13 to 16 to discharge their cathode condenser 26 to a negative condition, after the preceding signal impulse is transmitted.

At such time as the tube 44 is rendered conducting, such tube being assigned to the No. 5 impulse interval, its output cathode circuit will impress potential through a silicon carbide varistor and over a conductor 73 to the normally negatively biased grid of the normally nonconducting left-hand stop section of the tube 67. The output pulses from the start-stop oscillator 52 which are amplified and impressed on the conductor 58 are impressed on the grid of the left-hand section of the tube 67. Thus, with the grid of that section of the tube receiving a conditioning potential from the distributor tube 44, upon the receipt of the next distributor drive impulse the left-hand section of the tube 67 will be rendered conducting. This operating pulse is received after an interval of conduction of the tube 44 sufficient for the transmission of the No. 5 code signal impulse. Upon the left-hand section of the tube 67 being rendered conducting the tube 44 will be extinguished through the use of the common anode resistor 46.

The left-hand section of the tube 67 will conduct momentarily only as it is of the vacuum variety and receives but a single impulse through the condenser in the conductor 58 to its grid. However, such interval of conduction will be sufficient to extinguish the tube 44, as mentioned. As the left-hand section of the tube 67 is rendered nonconducting potential will rise on the conductors 39 and 48, since no current will be drawn through the common anode resistor 46 to any of the tubes 38, 40 to 44, or 67. This potential rise will impress sufficient potential on the grid of the right-hand oscillator control section of the tube 49 to cause the latter section to be rendered conducting. Increased positive potential is then impressed from the cathode circuit of this tube section over the conductor 51 and reduced potential is impressed from its anode circuit, both causing a blocking of the operation of the start-stop oscillator 52, as described previously.

At the time that the left-hand section of the tube 67 is rendered nonconducting a potential rise will also occur on a conductor 74 which interconnects the conductor 39 and the grid of the right-hand section of the tube 17. In this manner, that section of the tube 17 will be rendered conducting momentarily to cause the cathode condenser 26 of the left-hand section of the tube 17 to be discharged if it had been in a charged condition due to a stored signal element. Thus, the cathode condensers 26 of all of the tubes 13 to 17, inclusive, will now be in readiness to receive the next code signal comprised of five impulse conditions.

It might be mentioned at this time that with the system operating as described above, if a blank signal were to be received from the receiving multiplex apparatus, which consists of five spacing impulses, none of the left-hand sections of the tubes 13 to 17, inclusive, would be rendered conducting, nor would the associated right-hand sections of the tubes 20 to 24, inclusive, be rendered conducting. Further, the right-hand section of the tube 29 would not be rendered conducting, nor would the condenser 32 be discharged. Thereafter upon receipt of the next positive multiplex operating pulse over the conductor 36 the left-hand section of the tube 29 would not be rendered conducting as with the condenser 32 not discharged the cathode will already be positive with respect to the grid. Therefore, no positive impulse will be impressed over the conductor 31 to the grid of the left-hand section of the tube 34. That tube section will not be rendered conducting and so no positive potential will be impressed from its cathode output circuit and over the conductor 37 to the grid of the start tube 38, and so the tube 38 will not be rendered conducting. With this condition existing the start-stop oscillator 52 will not be released for a cycle of operation and the converter apparatus will not operate to impress the blank signal on the conductors 63. Therefore, with the apparatus operating as described above no blank signal conditions in the signal initiating means will be passed or retransmitted to the start-stop receiver 62, the latter receiving only a continuous marking stop or rest pulse.

If it now be assumed that the manually operable switch 33 be moved to its other or right-hand position the portion of the conductor 31 above the switch 33 will be connected through the switch 33 to a conductor 76 which extends to the anode of the normally nonconducting right-hand section of a twin triode vacuum tube 77, and to the cathode of the normally nonconducting left-hand section of the tube. The normally negatively biased grid of the left-hand section of the tube 77 is connected by a conductor 78 to the conductor 36 on which is received the positive multiplex operating impulses, originating at the multiplex receiver.

The normally slightly negatively biased grid of the right-hand section of the tube 77 is connected by a conductor 79 to the connector 11, and thence to the multiplex receiver. The described position of the switch 33 is utilized in schemes of transmission where a sixth pulse, following the five signal impulses is originated invariably such as for instance in the transmission of cipher signals which include the blank start-stop signal combination and must be retransmitted.

Under this scheme of operation a sixth code element will be transmitted invariably following the five code signal impulses from the transmitting apparatus to the receiving multiplex apparatus for each bona fide character combination or signal including the blank, and will appear as a positive impulse to the connector 11 and the conductor 79. Therefore, each time that the positive sixth pulse is received on the conductor 79 it will impress positive potential on the grid of the right-hand section of the tube 77.

A condenser 81 is connected in the output cathode circuit of the left-hand section of the tube 77 intermediate the connection with the conductor 76 and negative battery. However, at this time the condenser 81 will be charged positively by the receipt previously of a multiplex operating impulse, as will be described more in detail later. Thus, upon the receipt of the positive sixth pulse on the conductor 79 to the grid of the right-hand section of the tube 77, the condenser 81 will discharge over the conductor 76 to the anode of the right-hand section of the tube 77 and thence through the tube. This will have no effect in releasing the apparatus for operation as it will cause a negative impulse to appear at the grid of the left-hand section of the tube 34, as described previously. However, it will cause the cathode of the left-hand section of the tube 77 and the condenser 81 to assume a negative potential.

At some time subsequent to the receipt of the five signal element impulses and the accompanying sixth element the positive multiplex operating pulse will be received on the conductors 36 and 78 and the grid of the left-hand section of the tube 77. This will result in the left-hand section of the tube being rendered conducting.

Upon the left-hand section of the tube 77 being rendered conducting positive potential will be impressed to its output cathode circuit, charging the condenser 81 positively. The positive potential will not be dissipated through the right-hand section of the tube 77, as that section only conducted momentarily previously while the condenser 81 was discharged. The sudden change to a positive potential will also be impressed to the conductor 76. Such potential will be impressed from the conductor 76 to the switch 33 and thence over the conductor 31 to the grid of the left-hand section of the tube 34, causing it to be rendered conducting. Upon the left-hand section of the tube 34 becoming conducting potential will be impressed from its output cathode circuit and over the conductor 37 to the control grid of the start tube 38. The tube 38 will be rendered conducting, causing the right-hand oscillator control section of the tube 49 to be rendered non-conducting because of the common anode resistor 46. This will result in the apparatus being released for a cycle of operation, all as has been described previously.

The left-hand section of the tube 77 will conduct momentarily only, because of the condenser in the conductor 78, but the time will be sufficient to charge the condenser 81 and to render the left-hand section of the tube 34 conducting.

From the above description it may be understood that the converter apparatus is released under the sole control of the sixth code impulse regardless of whether a marking condition exists for any of the five signal impulses. Therefore, even though a blank, all spacing, signal condition may be received at the converter it will be released to impress such signal to the conductors 63 for use or recordation at the start-stop receiver 62. The start and stop impulses will be added to the blank signal in a manner similar as was described previously for a signal having a marking component. As mentioned above, the receipt of the sixth pulse is invariable to the converter apparatus upon the reception of each character combination presented originally to the multiplex receiver by distant transmitting apparatus. The sixth impulse is not, under the above embodiment, transmitted to the start-stop receiver 62 but serves solely for control purposes for the instant converter. During idle periods, or when the multiplex circuit exceeds the speed of operation of the incoming start-stop circuit by a full cycle, the sixth element will not be transmitted for one or more blank code groups, and the receiving apparatus will not be tripped off into cycling, the condenser 81 remaining positively charged between successive applications of the multiplex operating impulse, to conductor 78. During such interval, the right-hand section of tube 67 will remain conducting, and an extended stop or rest pulse will be transmitted to the start-stop receiver 62.

While specific embodiments of the invention have been illustrated and described it is obvious that the invention is not limited to such disclosures but that additions and modifications may be made thereto within the scope and spirit of the invention.

What is claimed is:

1. In a multiplex to start-stop converter in combination with a multiplex receiver, a start-stop distributor, a start-stop oscillator for operating said distributor, a plurality of tubes each of which is assigned to one of the components of a multi-component code signal received from said multiplex receiver, a plurality of condensers each of which is controlled by one of said tubes, a plurality of secondary tubes controlled by said condensers for storing the signal condition, means jointly responsive to the storage of a signal in said secondary tubes and to said multiplex receiver for releasing said oscillator for operation, and means controlled by said secondary tubes and said distributor for retransmitting the received signals.

2. In a multiplex to start-stop converter in combination with a multiplex receiver, a start-stop distributor, a start-stop oscillator for operating said distributor, a plurality of tubes each of which is assigned to one of the components of a multi-component code signal, received from said multiplex receiver, a plurality of condensers each of which is controlled by one of said tubes, a plurality of secondary tubes controlled by said condensers for storing the signal condition, means jointly responsive to the storage of a signal in said secondary tubes and to said multiplex receiver for releasing said oscillator for operation, means controlled by said secondary tubes and said distributor for retransmitting the received signals, and means for discharging completely said condensers successively after each signal component has been transmitted.

3. In a multiplex to start-stop converter in combination with a multiplex receiver, a start-stop distributor, a start-stop oscillator for operating said distributor, a plurality of tubes each of which is responsive to one of the components of a multi-component code signal received from said multiplex receiver, said tubes being rendered conducting upon the receipt of a marking component, a condenser in the output circuit of each of said tubes, said condensers being charged upon its associated tube being rendered conducting, a plurality of storage tubes each of which is associated with one of said condensers, whereby upon one of said condensers being charged its associated storage tube will be rendered conducting, means jointly responsive to one of said storage tubes being rendered conducting and to said multiplex receiver for releasing said oscillator for operation, and means controlled by said distributor and said storage tubes for retransmitting the received signals.

4. In a multiplex to start-stop converter in combination with a multiplex receiver, a start-stop distributor, a start-stop oscillator for operating said distributor, a plurality of tubes each of which is responsive to one of the components of a multi-component code signal received from said multiplex receiver, said tubes being rendered conducting upon the receipt of a marking component, a condenser in the output circuit of each of said tubes, said condenser being charged upon its associated tube being rendered conducting, a plurality of storage tubes each of which is associated with one of said condensers, whereby upon one of said condensers being charged its associated storage tube will be rendered conducting, means jointly responsive to one of said storage tubes being rendered conducting and to said multiplex receiver for releasing said oscillator for operation, a plurality of mixer tubes under the joint control of said distributor and said storage tubes, and means controlled by said mixer tubes for retransmitting the received signals.

5. In a multiplex to start-stop converter in combination with a multiplex receiver, a start-stop distributor, a start-stop oscillator for operating said distributor, a plurality of tubes each of which is assigned to one of the components of a multi-component code signal received from said multiplex receiver, a plurality of condensers each of which is controlled by one of said tubes, a plurality of secondary tubes controlled by said condensers for storing the signal condition, means jointly responsive to the storage of a signal in said secondary tubes and to said multiplex receiver for releasing said oscillator for operation, means controlled by said secondary tubes and said distributor for retransmitting the received signals, and means to insert automatically start and stop components to the retransmitted signals.

6. In a multiplex to start-step converter in combination with a multiplex receiver, a start-stop distributor, a start-stop oscillator for operating said distributor, means for receiving code signals from said multiplex receiver comprising an intelligence portion and a control portion, means for storing the intelligence portion of the received signals, a first tube having a normally charged condenser in its output circuit, a second tube rendered conducting upon the receipt of the control portion of the code signals for discharging said condenser, means responsive to the receipt of a multiplex operating pulse to said first tube and the rendering conducting thereof for releasing said oscillator for operation, said condenser being charged simultaneously, and means controlled by said distributor and said storage means for retransmitting the intelligence portion of the received signals.

RANSOM D. SLAYTON.

REFERENCES CITED

The following references are of record in the file of this patent:

UNITED STATES PATENTS

| Number | Name | Date |
|---|---|---|
| 2,536,578 | Slayton | Jan. 2, 1951 |